United States Patent [19]

Marchant

[11] Patent Number: 4,506,697
[45] Date of Patent: Mar. 26, 1985

[54] FLOW CONTROL VALVE

[75] Inventor: George W. Marchant, Crawley, England

[73] Assignee: APV International Limited, Crawley, England

[21] Appl. No.: 456,210

[22] Filed: Jan. 7, 1983

[30] Foreign Application Priority Data

Jan. 7, 1982 [GB] United Kingdom ............... 8200436

[51] Int. Cl.³ ............................................. F16K 11/06
[52] U.S. Cl. .................... 137/312; 137/240; 137/625.46
[58] Field of Search .............. 137/240, 312, 625.46, 137/876; 251/314, DIG. 1; 277/170, 171

[56] References Cited

U.S. PATENT DOCUMENTS

| 2,631,001 | 3/1953 | Griswold | 137/312 |
| 2,988,107 | 6/1961 | Rudelick | 137/876 X |
| 3,159,378 | 12/1964 | Haag | 251/DIG. 1 X |
| 3,658,093 | 4/1972 | Kirkwood | 137/312 X |
| 3,827,285 | 8/1974 | Grove | 137/312 X |
| 3,938,553 | 2/1976 | Ortega | 251/DIG. 1 X |
| 3,978,707 | 9/1976 | Grove et al. | 137/312 X |
| 4,003,394 | 1/1977 | Adams | 137/240 X |
| 4,067,352 | 1/1978 | Halpine | 137/312 |
| 4,108,199 | 8/1978 | Bonafous | 137/312 |
| 4,217,934 | 8/1980 | Peters | 137/625.69 X |

FOREIGN PATENT DOCUMENTS

| 958836 | 3/1950 | France | 137/625.46 |
| 1304189 | 4/1962 | France | 137/625.46 |
| 1434078 | 4/1976 | United Kingdom | 137/876 |
| 2072307 | 9/1981 | United Kingdom | 137/240 |

Primary Examiner—Gerald A. Michalsky
Attorney, Agent, or Firm—Hamilton, Brook, Smith & Reynolds

[57] ABSTRACT

In order to provide a valve which can provide separate flow paths for independent liquids and the possibility of interchanging the flow paths, there is provided an elliptical valve member 8 mounted on a spindle 7 within a cylindrical valve chamber. In the axial region of the valve member 8 there are provided ports 2 and 3 which are selectively placed in communication with the ports 4 and 5 in accordance with the position of the valve member 8. In order to provide for a safety break leakage path, the valve member 8 is preferably provided with two seals 13, e.g. lip seals or O-ring separated by a space which is vented, e.g. via a hollow passage 18 in the spindle 7.

4 Claims, 8 Drawing Figures

FLOW CONTROL VALVE

This invention relates to flow control valves adapted to achieve a flow changeover by means of a single valve operation.

In one previous form of valve, described in our U.K. Patent Specification Nos. 1352721 and 1352722, a changeover has been obtained by means of 180° bend units carried on a rotary plate which has to be abutted to pipe ends and pneumatically operated in rotation and axially.

In accordance with the present invention there is provided a flow control valve comprising a valve body including a cylindrical valve chamber having at least one pipe connection at an intermediate axial location, an elliptical, flow-directing valve member mounted on a spindle extending axially of the valve chamber, the said valve member being in sealing engagement with the valve chamber around its circumference and located obliquely on the spindle so as to extend across the said intermediate axial location, whereby the valve member divides the valve chamber into two compartments and the or each of the said at least one pipe connection communicates selectively with the two compartments depending on the position of the valve member, and one or more further pipe connections to the compartments of the valve chamber to be selectively connected to the said at least one pipe connection by operation of the said valve member, in which the valve member is provided with duplex sealing surfaces in circumferential engagement with the valve chamber and defining a leakage zone between the two sealing surfaces, which leakage zone is vented to atmosphere.

With a true changeover valve a further pipe connection will be provided to each compartment of the valve chamber.

The leakage zone between the two sealing surfaces may be vented via a hollow part of the said spindle. Alternatively, in order to enable the valve to be used in a horizontal mode, venting may be by a vent in the body at a point common to the leakage zone in both extreme positions of the valve.

The one or each seal may be provided by a preferred sealing member, such as an O-ring or lip seal, fitted in an undercut recess on the valve member.

The invention will be further described with reference to the accompanying diagrammatic drawings, in which.

Figure 1:
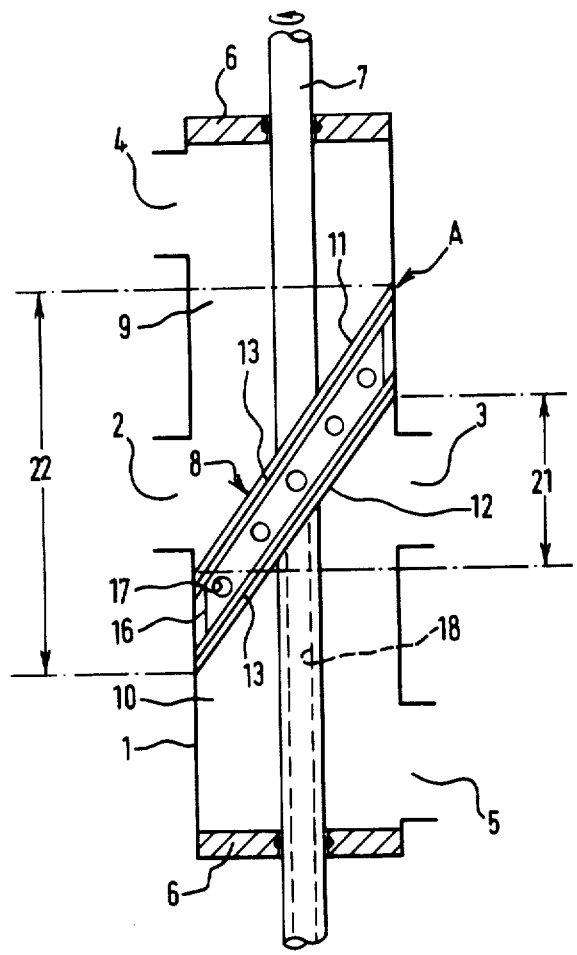
FIG. 1 is a sectional view of a flow control valve according to one form of the invention.
Figure 2:
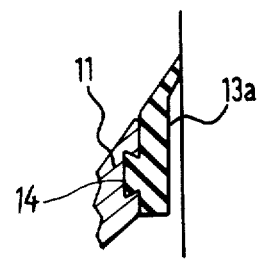
FIG. 2 is an enlarged detail from within the circle A of FIG. 1 showing one form of seal.

FIG. 1 shows a valve body of cylindrical form defining within it a valve chamber. First and second pipe connections 2 and 3 to the valve chamber are provided in substantial opposition at the same axial location. Third and fourth connections 4 and 5 are provided adjacent the ends of the valve chamber. The ends of the valve chamber are sealed by end caps 6 through which passes sealingly a valve spindle 7. Mounted on the valve spindle 7 is a valve element generally indicated by 8 and adapted to divide the valve chamber into upper and lower compartments 9 and 10 respectively. The valve element 8 consists of a pair of elliptical flow directing plates 11 and 12 each mounted obliquely on the spindle 7. The edge of each of the plates 11 and 12 is provided with a recess to receive a seal 13 in engagement with the wall of the valve chamber. In order to provide for retention of the seal, it is preferably mounted in an undercut slot 14 as indicated in FIG. 2. FIG. 2 shows a lip seal 13a mounted in the undercut slot 14.

The flow directing plates 11 and 12 are spaced apart by a separating ring 16 which is provided with a number of perforations 17 and the space within the ring 16 is vented via a hollow portion 18 of the spindle 7. Thus, any fluid leaking past either of the seals 13 is vented and does not pass to the other flow passage.

It will be seen that in the position illustrated, the port 3 is in connection with the port 5 and the port 2 is in connection with the port 4. By rotating the spindle 7 through 180°, a changeover will be achieved whereby the port 3 will be in communication with the port 4 and the port 2 with the port 5.

If the rotation is stopped at an intermediate point at around 90° from the illustrated position, the valve member 8 will extend across both ports 2 and 3, so that in this position the valve may be cleaned without dismantling. Some cleaning fluid will also enter the safety break space between the seals and be vented through the hollow portion 18, which is thus also cleaned.

It will be realised that the ports 2 and 3, which are to be selectively placed into communication with the compartments 9 and 10 of the valve chamber, need to be located wholly within the minimum inner dimensional limits of the area swept out by the seals 13 as the valve rotates. These limits are indicated by the lines 21 in FIG. 1. Although preferably directly opposite to each other, the ports 2 and 3 may in fact be somewhat offset from a true 180° to each other. So far as the ports 4 and 5 are concerned, it will be realised that these must be outside the maximum outer dimensional limits of the area swept out by the seals 13. These limits are indicated by the lines 22 in FIG. 1. It will also be realised that these ports can be at any orientation in relation to the ports 2 and 3 and in fact more than one port may be provided at either or both compartments if required. Further, one or other of these connections may not be used if the valve is to be effective to close one flow and open the other.

The construction has been described as incorporating an assembly of flow directing plates and spindles, but it is possible that the spindle and valve element can be cast in one piece, e.g. by an investment casting technique.

The seal may possibly incorporate both a lip seal and a ring seal and the lip seal may be double. Also, it is possible to gang two or more valve members on a single shaft to provide double or multiple changeover functions, depending on the arrangement of connections.

With the arrangement as shown in FIG. 1, the valve can only really be used in a vertical orientation to enable proper draining through the hollow portion 18 of the shaft 7.

Figure 3:
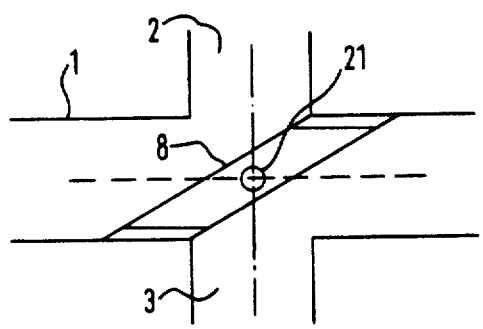
FIG. 3 illustrates an alternative form of venting.
Figure 4:
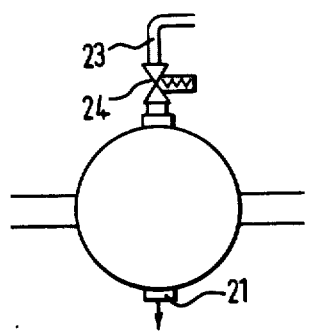
FIG. 4 is a diagrammatic end view of the arrangement of FIG. 3 showing an additional modification.

It may be preferred for the valve to be used in a horizontal orientation, and for this purpose an arrangement as shown in the diagrams of FIGS. 3 and 4 may be used. In this arrangement, the body 1 is provided with a vent aperture 21, leading to drain or atmosphere by providing a suitable aperture in a position on the body which is in communication with the leakage space when the valve member 8 is in both of the extreme operated positions.

Thus, in either of the extreme operated positions, which are 180° apart in the rotation of the valve member 8 about the axis, the leakage path will be vented to atmosphere or drain via the outlet 21, and the two ends of the valve chamber will be isolated from each other and may be independently cleaned. Thus one end may be cleaned while the other is still holding a product. In an intermediate position, e.g. 90° from either of the operated positions, the connections are all common together with the leakage path, and the outlet 21 can be used as a system drain during cleaning.

FIG. 4 shows in addition how an independent cleaning line 23 controlled by a solonoid valve 24 can be positioned diametrically opposite the connection 21 so that the leakage zone and leakage path may be cleaned as required.

Figure 5:
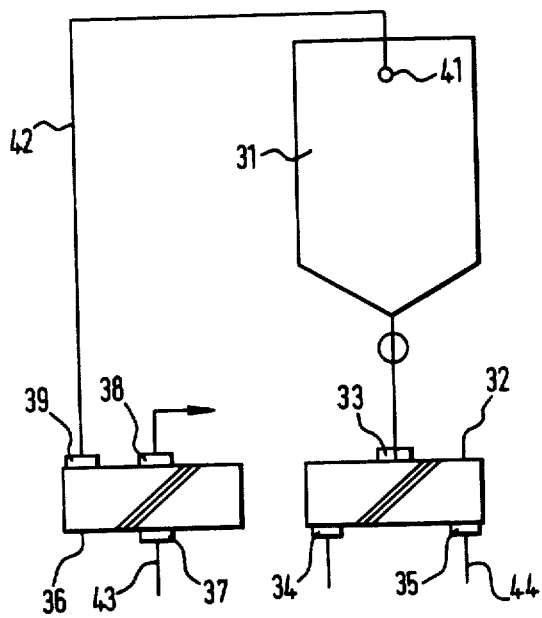
FIG. 5 shows a typical installation in any two valves in accordance with the invention in one position of operation.

Turning now to FIG. 5, there is shown how valves in accordance with the invention may be used in the filling and cleaning circuit for a tank 31. One valve 32 has a single central connection 33 and two end connections 34 and 35, while a valve 36 has two central connections 37 and 38 and an end connection 39. For filling or discharge of the tank 31, the product is fed or discharged to the connection 34 and out via the connection 33 and into the tank. A spray ball 41 acts as a vent to atmosphere via a line 42 and the connections 39 and 38, of which the latter is connected to atmosphere possibly by a sterilising filter. It will be seen that a cleaning line 43 attached to the connection 37 is isolated, and a cleaning return line 44 attached to the connection 35 is also isolated.

Figure 6:
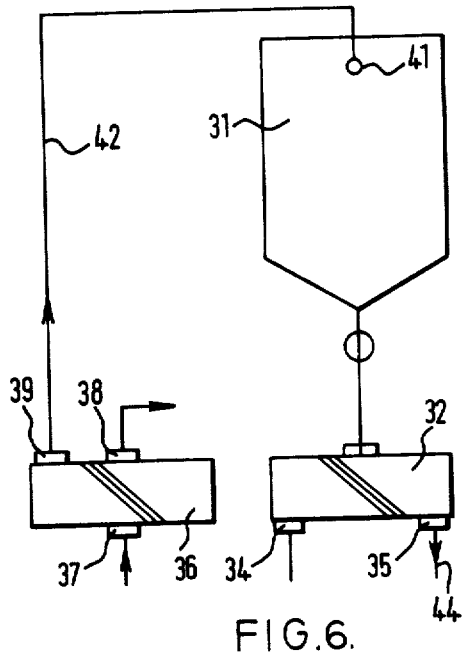
FIG. 6 is a view similar to FIG. 5 in a different position.

When the cleaning of tank 31 is required, the valves are changed over to the positions shown in FIG. 6 so that cleaning fluid comes in via the connection 37 and 39 to the line 42 to the spray ball 41 to clean the interior of the tank. The cleaning fluid drains down and out through the connection 35 to the CIP return line 44. In this position, it will be seen that the atmosphere connection 38 and the product connection 34 are both isolated from the tank. Obviously, any cleaning fluid leaking past its respective seal on the valve will pass out via the leakage path in the valve, and not into the product line or to atmosphere.

Figure 7:
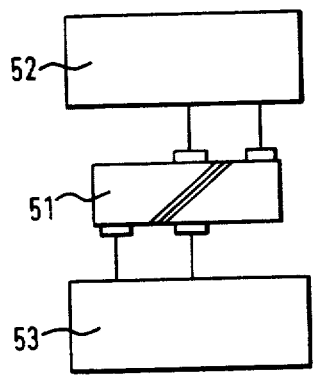
FIG. 7 shows another modification using a valve in accordance with the invention.
Figure 8:
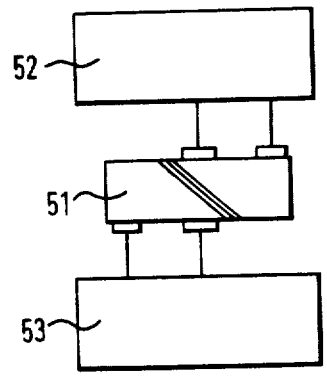
FIG. 8 shows the modification of FIG. 7 in another mode of use.

In the arrangement shown in FIG. 7 a valve 51 in accordance with the invention is shown as connecting two items of process plant 52 and 53. When the valve 51 is changed over to the positions shown in FIG. 8, it will be seen that the process plants 52 and 53 are isolated from each other.

Various modifications may be made within the scope of the invention.

I claim:

1. A flow control valve comprising a valve body including a cylindrical valve chamber having at least one pipe connection at an intermediate axial location for selective connection to at least one further pipe connection, a spindle extending axially of the valve chamber, an elliptical, flow-directing valve member mounted on the spindle, said valve member having duplex sealing surfaces in sealing engagement with the valve chamber around its circumference to define a leakage zone, said valve member being located obliquely on the spindle so as to extend across said intermediate axial location such that the valve member divides the valve chamber into two compartments and said at least one pipe connection communicates selectively with the two compartments depending on the angular position of the valve member, said at least one further pipe connection being connected to the compartments of the valve chamber to be selectively connected to said at least one pipe connection by operation of said valve member, and said leakage zone being vented to atmosphere, each of said duplex sealing surfaces being provided by a circumferential sealing member in the form of a lip seal and having a body thereof received in an undercut recess in the valve member.

2. A flow control valve as claimed in claim 1, in which the leakage zone is vented via a hollow part of the spindle.

3. A flow control valve as claimed in claim 1, in which the body is provided with a leakage vent at a point communicating with the leakage zone in both extreme operated positions of the valve member.

4. A flow control valve as claimed in claim 1, in which the spindle and valve member are cast together in one piece.

* * * * *